Sept. 26, 1944.  O. K. SCHMIED  2,359,250
WRAPPING MATERIAL
Filed April 12, 1940
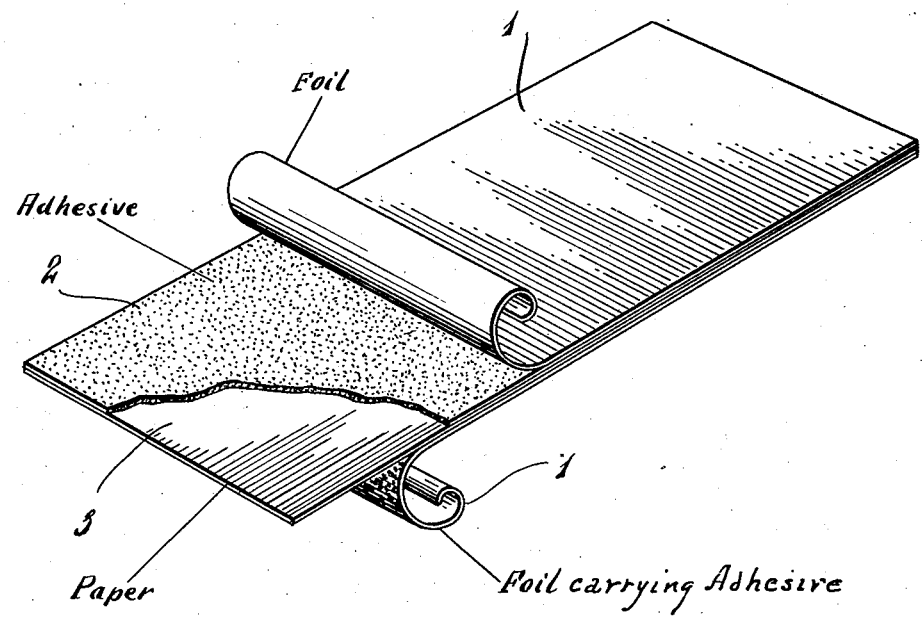
INVENTOR.
Orville K. Schmied
BY
W. Lee Helms.
ATTORNEY Patented Sept. 26, 1944

2,359,250

UNITED STATES PATENT OFFICE 2,359,250

WRAPPING MATERIAL

Orville K. Schmied, Upper Montclair, N. J., assignor to Reynolds Research Corporation, New York, N. Y., a corporation of Delaware Application April 12, 1940, Serial No. 329,308

4 Claims. (Cl. 154—46)

This invention relates to a new and improved laminated wrapping material formed from coextensive sheets of metal foil, paper, and an asphalt-rubber layer; all of the said layers combining to form a flexible, resilient, moisture and air proof lamination which has pliability, drape, foldability, tensile strength of high order and diminishment of the metal "crackle" characteristic of metal foils of temper. The rubberasphalt layer is permanently tacky and the new wrapping material is relatively shock proof. The layers do not blister and crack due to normal temperature changes. Particularly, the outer layers of foil are relatively "scuff-proof."

Heretofore, various suggestions have been made for laminated materials which would incorporate single or multiple layers of metal foil and some type of bonding agent or adhesive of appropriate character which would fill in metal pores and give added strength and pliability, moisture and air-proofing to the metal foil. The use of asphalt itself as a bonding agent for metal foil laminations has not proved successful because the metal foil layers wrinkle, creep and blister. Also, the asphalt is brittle when cold and soft when warm and thus, does not have any resistance to heat conditions when the stock is printed or worked under temperature conditions.

It is very desirable to have two layers of extremely thin foil which are strengthened and made air and moisture proof by a cheap, flexible and shock-proof bonding agent, but to date, there has been a complete failure in producing such a combination. One reason for failure has been that the adhesive must add to the strength of the lamination and also preferably to the pliability, drape, and shock proof characteristics as well as to its air and moisture proofing properties; also, if such an adhesive or bonding agent contains a relatively low volatile solvent, particularly water, and a layer of adhesive is placed between the two layers of metal foil, it is difficult for the adhesive to dry, because of the relatively impervious qualities of the foil, and if the adhesive does dry to a degree after the elapse of a substantial period of time, it tends to dry unevenly, making manufacturing operations difficult. Highly volatile solvents, as a general rule, are expensive and may be explosive. The foregoing factors explain why foil laminations of the type described have not been thought practical.

Accordingly, optimum conditions require a heat fusible bonding agent which definitely is not in water solution and preferably requires no solvent whatsoever, as the drying of such solvent, even if practical, would delay commercial production.

Therefore, it is an object of my invention to provide a new unique and improved wrapping material, having the qualities above indicated as desirable by incorporatting herein a new and improved bonding agent or adhesive which gives the new wrapping material qualities of air and moisture proofing, drape, strength, resistance to shock and to scuffing, flexibility, lack of brittleness, resistance to temperature changes, and freedom from wrinkling and blistering.

The accompanying drawing illustrates an embodiment of the invention, wherein the outer layers of relatively thin foil are indicated at 1, one inner adhesive layer is shown at 2, and the relatively thin paper layer between the adhesive layer and one of the foil layers is indicated at 3.

I will now describe an illustrative form of my invention:

An aluminum foil .0003"–.0006" in thickness may be joined by water solvent adhesive such as casein latex or casein rubber to a 15 pound to 60 pound paper and this paper mounted stock, after the adhesive is dry, in turn, may be joined by its paper side to an additional layer of aluminum foil .0003"–.0006" thick by means of an asphalt-reclaimed rubber layer of adhesive, the latter being between .0003"–.0008" in thickness. This asphalt-rubber adhesive will be formed of 97–8% asphalt and about 2–3% reclaimed rubber, intimately associated by heat in fine milled form.

I have found the combination of asphalt and reclaimed rubber, as set forth above, to give a new and improved wrapping lamination. Asphalt without rubber is brittle under cold conditions and soft under heat conditions, but the addition of the rubber gives a relatively permanently tacky heat fusible adhesive which, when combined with the paper and foil layers above described, gives a new and unique product which is air and moisture proof, wrinkle proof, nonblistering, has good tensile strength and pliability, is flexible but not brittle, is resistant to temperature changes, and is relatively "scuffproof."

I have found a particularly suitable wrapping material of extremely good strength and drape which may be formed of a .00035" aluminum foil joined by a water solvent adhesive such as animal glue, casein latex, or starch, to a 15 pound tissue, which combination is united by its paper side to an additional layer of .00035" aluminum foil by a layer of .0003" asphalt-rubber adhesive, in which latter there is a 98% asphalt and 2% reclaimed rubber. Where materially high percentages of rubber are employed, namely: substantially more than 3%, I find that the adhesive becomes too tacky when heated, and that it can not be flowed by hot roll applicator apparatus. However, with other forms of applicator apparatus, higher percentages of rubber conceivably could be employed, and therefore, the ranges specified should not be decreed as restricting the scope of the invention. Such an adhesive requires no solvents but flows at a temperature of about 475° F.

The paper layer gives body and tensile strength to the laminations above described. If the paper is eliminated from the combinations, the material still has substantial strength and body, (dependent upon the thickness of the foil and adhesive layers), and also has good drape quality and foldability, as well as the qualities of being impervious to the passage of air and water.

The laminations described are particularly appropriate to the packaging of tobacco, medicinal and food products and the like, and in certain instances, the exposed foil surfaces may be coated with cellulose derivatives or vinyl resins or similar resinous coatings with or without plasticizers to protect the metal foil surface from chemical action, and if desired, for a heat sealing medium.

At present, there is wide usage of cellulose or rubber derivative films for laminating with metal foils for the formation of flexible packages where the object is to obtain a relatively flexible package.

In the formation of such packages, laminating difficulties are encountered, and also, when the packages are fabricated or shipped, the metal foil at the folds of the packages at times tends to crack, thus reducing the efficiency of the package. The material described herein above is intended to replace and to supplant such film-foil laminated packages, and I have found that wrapping material made in accordance with my invention can be utilized to form such flexible envelopes, particularly when coated upon one surface with a heat sealing lacquer film such as a lacquer formed of a copolymer of vinyl chloride and vinyl acetate (preferably 87% of chloride and 12% of acetate), which is plasticized with about 15% diamyl phthalate, and it will be realized that such thermoplastic lacquer coated wrapping material for the formation of flexible bags and packages is within the purview of the present invention.

Also, it is obvious that those skilled in the art may substitute equivalents for the constituents of reclaimed rubber, and it will be understood that such equivalents are comprehended within the scope of the appended claims where "reclaimed rubber" is defined.

Essentially, my invention revolves around the idea of a laminated metal packaging medium having strength, flexibility, and diminished crackle, and which is impervious to the passage of air and water, and which laminated product is not affected by ordinary temperature changes, and accordingly, reference should be had to the appended claims for the scope of my invention, it being realized by those skilled in the art that certain parts of my invention may be utilized without certain other parts thereof, or alternatively that certain parts of my invention could have substituted therefor equivalent steps, elements or processes. Also, the invention may be applied to rigid combinations employing stiff, heavy paper board, where drape is not desired, and rigidity and "scuff-proof" qualities are desirable.

I claim:

1. As a new product, a laminated wrapping material which includes outer layers of relatively thin aluminum foil, an inner adhesive layer of asphalt-reclaimed rubber comprising about 98% asphalt and 2% reclaimed rubber, and a relatively thin paper layer between said adhesive layer and one of said outer metal aluminum foil layers, said wrapping material being impervious to the passage of air and moisture, having substantial strength, flexibility, drape quality and foldability, and being relatively resistant to the effects of temperature changes.

2. A wrapping material as defined in claim 1, wherein the aluminum layers range between .0003"–.0006" in thickness, the paper layer ranges between a 15 pound and 60 pound paper, and the asphalt-rubber layer of adhesive ranges between .0003"–.0008" in thickness.

3. A wrapping material as defined in claim 1, wherein the aluminum foil layers are .00035" thick, the paper layer is a 15 pound tissue, and the asphalt-rubber adhesive layer is .0003" thick.

4. As a new wrapping material, a laminated product having outer relatively thin layers of aluminum foil and an inner relatively thin layer of paper joined to one of the aluminum layers by water soluble adhesive, and also a relatively strong and heavy layer of permanently tacky adhesive between said paper layer and the other of said aluminum layers, said permanently tacky adhesive layer giving drape quality, flexibility, pliability and strength to said lamination, without causing wrinkles or blisters, and also causing said lamination to be relatively impervious to the passage of air and moisture, said tacky adhesive comprising a mixture of about 98% asphalt and about 2% reclaimed rubber, which mixture is heat fusible.

ORVILLE K. SCHMIED.